United States Patent
Chao

(10) Patent No.: US 9,492,958 B2
(45) Date of Patent: Nov. 15, 2016

(54) CASE HAVING SPEAKER MESH MODULE AND MANUFACTURING METHOD THEREOF

(71) Applicant: GETAC TECHNOLOGY CORPORATION, Hsinchu County (TW)

(72) Inventor: Po-Tsun Chao, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 172 days.

(21) Appl. No.: 14/500,857

(22) Filed: Sep. 29, 2014

(65) Prior Publication Data

US 2015/0172796 A1 Jun. 18, 2015

Related U.S. Application Data

(60) Provisional application No. 61/917,279, filed on Dec. 17, 2013.

(30) Foreign Application Priority Data

Apr. 8, 2014 (CN) .......................... 2014 1 0137168

(51) Int. Cl.
*H04R 9/06* (2006.01)
*B29C 45/16* (2006.01)
(Continued)

(52) U.S. Cl.
CPC ..... *B29C 45/1671* (2013.01); *B29C 45/14008* (2013.01); *B29C 45/14778* (2013.01); *B29C 45/14786* (2013.01); *B29C 45/14795* (2013.01); *B29C 45/14811* (2013.01); *H04R 1/023* (2013.01); *B29K 2995/0069* (2013.01);
(Continued)

(58) Field of Classification Search
CPC ............. B29C 35/08; B29C 45/1671; B29C 45/14008; B29C 45/14778; B29C 45/14786; B29C 45/14795; B29C 45/14811; H04R 1/023; H04R 31/00; H04R 2499/11; H04R 9/047; H04R 9/025; H04R 7/04; H04R 7/18; H04R 7/24; H04R 2307/029; H04R 31/003; H04R 25/00; B29K 2995/0069; B29L 2009/00; B29L 2031/3406; B29L 2031/737
USPC ....... 381/431, 432, 391, 392, 395, 386, 385, 381/347, 345, 346, 351, 354, 374, 184, 387, 381/388, 389, 189, 398, 124, 332, 333, 381/334; 700/94; 181/149, 234
See application file for complete search history.

(56) References Cited

U.S. PATENT DOCUMENTS

2010/0092022 A1* 4/2010 Hopkinson ............ H04R 1/023 381/391
2013/0057804 A1* 3/2013 Kuo ....................... G06F 1/1601 349/60

*Primary Examiner* — Leshui Zhang

(57) ABSTRACT

A case having a speaker mesh module and a manufacturing method thereof are provided. The case includes a base, a speaker mesh module and a combination member. The base is formed with a filling port and an opening in which the speaker mesh module is correspondingly placed. The speaker mesh module is formed with a buckle part and a sound output part. The combination member is secured on the base through the filling port with an injection molding means and served to cover the speaker mesh module. The combination member is formed with a combining part mutually fastened with the buckle part and a penetrated hole corresponding to the sound output part. Accordingly, the speaker mesh module is able to be sealed in the opening with a means other than adhering, thereby allowing the case to be provided with a stable and excellent waterproof performance.

12 Claims, 8 Drawing Sheets

(51) Int. Cl.
  *B29C 45/14* (2006.01)
  *H04R 1/02* (2006.01)
  *B29L 9/00* (2006.01)
  *B29L 31/00* (2006.01)
  *B29L 31/34* (2006.01)
  *H04R 31/00* (2006.01)

(52) U.S. Cl.
  CPC ..... *B29L2009/00* (2013.01); *B29L 2031/3406* (2013.01); *B29L 2031/737* (2013.01); *H04R 31/00* (2013.01); *H04R 2499/11* (2013.01)

CASE HAVING SPEAKER MESH MODULE AND MANUFACTURING METHOD THEREOF

BACKGROUND OF THE INVENTION

1. Field of the Invention

The present invention relates to a case structure, especially to a case having a speaker mesh module and a manufacturing method thereof.

2. Description of Related Art

A portable electronic device such as a notebook computer, a mobile phone, a watch, a walkman, a camera or a personal digital assistance has become a must-have item in our lives. As such, the portable electronic device might be operated in various environments such as shopping malls, party scenes, mountains, rivers or seashores when the user takes the portable electronic device with him/her. Accordingly, the portable electronic device has to be provided with excellent dustproof characteristic and waterproof effects.

As present, the means for enabling the portable electronic device to be provided with the dustproof characteristic and waterproof effects is to directly design a dustproof and waterproof case on the portable electronic device, or to store the portable electronic device in an external sealed case. For allowing the speaker of the portable electronic device to smoothly transmit sound to the exterior and avoiding the problems of poor sound quality, sound distortion and sound breaking. The case of the portable electronic device or the external sealed case is formed with an opening and a waterproof air-permeable film, wherein the opening is formed corresponding to the speaker and the waterproof air-permeable film is adhered on the case and served to seal the opening.

However, the arrangement of directly adhering the waterproof air-permeable film on the case has following disadvantages. First, the waterproof performance of the case of the portable electronic device or the external sealed case is determined by the adhesion status between the waterproof air-permeable film and the case. As such, if the adhesion status between the waterproof air-permeable film and the case performs poorly, the waterproof characteristics of the case of the portable electronic device or the external sealed case would be no loner provided. Second the waterproof air-permeable film detaches from the case easily when the case of the portable electronic device or the external sealed case is subject to a friction force or a shaking force, thereby causing the waterproof performance of the case of the portable electronic device or the external sealed case to fail.

In view of what has been disclosed above, the applicant of the present invention has devoted himself for improving the above-mentioned disadvantages.

SUMMARY OF THE INVENTION

The present invention is to provide a case having a speaker mesh module and a manufacturing method thereof, in which a combination member is secured on a base through a filling port with an injection molding means and served to cover the speaker mesh module, so the speaker mesh module is able to be sealed in an opening with a means other than adhering, thereby allowing the case to be provided with a stable and excellent waterproof performance.

Accordingly, the present invention provides a case having a speaker mesh module, which includes:

a base, formed with an opening and a filling port;

a speaker mesh module, correspondingly placed in the opening, and formed with a buckle part and a sound output part; and a combination member, secured on the base through the filling port with an injection molding means and served to cover the speaker mesh module, and formed with a combining part and a penetrated hole, wherein the combining part and buckle part are mutually fastened and the penetrated hole is formed corresponding to the sound output part.

Accordingly, the present invention provides a manufacturing method of a case having a speaker mesh module, which includes the steps of:

step a) providing a base, wherein the base is formed with an opening and a filling port;

step b) providing a speaker mesh module;

step c) placing the speaker mesh module in the opening;

step d) providing an injection device and a molding device, wherein the molding device is disposed corresponding to the base and the speaker mesh module; and step e) the injection device injecting a forming material through the filling port to the molding device so as to form a combination member, thereby allowing the combination member to be secured on the base and served to cover the speaker mesh module.

Advantages achieved by the present invention are as follows:

First, the combination member is secured on the base through the filling port with an injection molding means and served to cover the speaker mesh module thereby allowing the case to be provided with effects of dustproof and waterproof, and a speaker stored in the case is enabled to smoothly transmit sound to the exterior through the opening and the speaker mesh module.

Second, the base, the speaker mesh module and the combination member can be tightly matched through the injection molding means; accordingly, the case can be composed of simple components for allowing the case to be provided with effects of dustproof and waterproof, so the case has advantages of simple in components and easy in assembly.

Third, the buckle part is composed of grooves formed on the speaker mesh module; in the process of the injection device injecting the forming material through the filling port to the molding device, the grooves allow the forming material to flow into the space for being combined with the base so as to form a riveting force; when the forming material is formed as the combination member, the combination member is enabled to be tightly combined with the base with the injection molding means.

Fourth, the combination member is able to position the speaker mesh module with the injection molding means, thereby allowing the speaker mesh module to be stably placed and sealed in the opening; accordingly, the speaker mesh module is able to be sealed in the opening with a means other than adhering, thereby preventing the case from having poor dustproof and waterproof performance due to the insufficient adhesion.

Fifth, when the case is subject to a friction force or a shaking force, because the speaker mesh module is covered by the combination member, the speaker mesh module is still able to be stably placed and sealed in the opening, so the speaker mesh module and the base can still be tightly combined thereby preventing water from permeating and ensuring the structural stability, thereby allowing the case of the present invention to be provided with excellent dustproof and waterproof performance.

Sixth, the speaker mesh module is formed with a waterproof speaker mesh film and an adhesive film; the adhesive film is adhered between the waterproof speaker mesh film and the base thereby enabling the speaker mesh module to be placed in the opening, so the waterproof speaker mesh film is able to be tightly adhered on the base through the adhesive film, and the speaker mesh module can be stably placed and sealed in the opening, thereby further enhancing the dustproof and waterproof performance of the case.

DETAILED DESCRIPTION OF THE INVENTION

Preferred embodiments of the present invention will be described with reference to the drawings.

Please refer from FIG. 1 to FIG. 8, the present invention provides a case having a speaker mesh module and a manufacturing method thereof. The case 10 includes a base 1, a speaker mesh module 2 and a combination member 3.

Figure 1:
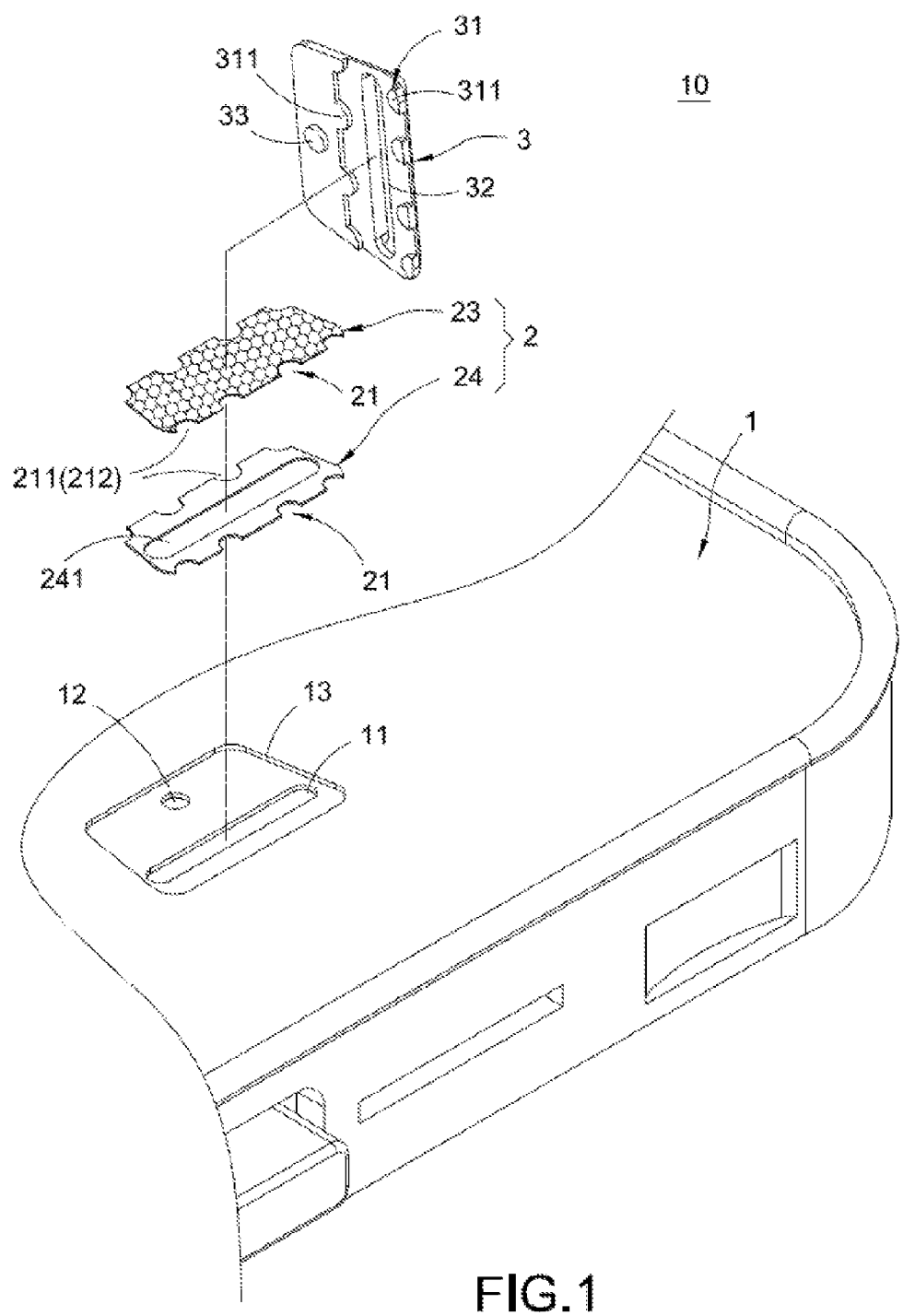
FIG. 1 is a perspective exploded view showing the case according to one embodiment of the present invention.
Figure 2:
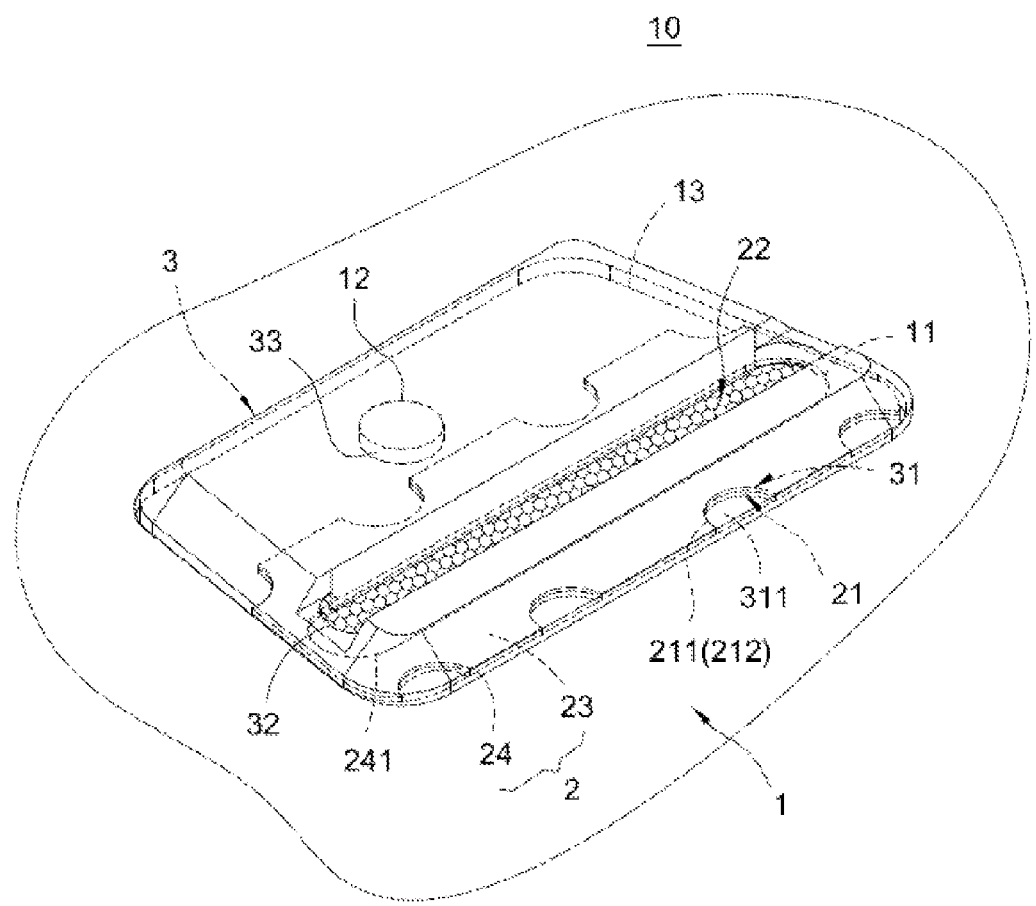
FIG. 2 is a perspective view showing the assembly of the case according to one embodiment of the present invention.

As shown in FIG. 1 and FIG. 2, the case 10 can be formed as an external sealed case for enclosing and storing an electronic device, or the case 10 can be formed as a case of an electronic device for enclosing and storing electric components of the electronic device. The electronic device can be a notebook computer, a mobile phone, a watch, a walkman, a camera or a personal digital assistance (PDA).

As shown in FIG. 1 and FIG. 2, the base 1 is formed with an opening 11 and a filling port 12. Detail illustration is as follows. The base 1 is formed with a recess 13, wherein the opening 11 and the filling port 12 are formed at the bottom of the recess 13.

As shown in FIG. 1 and FIG. 2, the speaker mesh module 2 is correspondingly placed in the opening 11. The speaker mesh module 2 is formed with a buckle part 21 and a sound output part 22, wherein the buckle part 21 is composed of one or a plurality of grooves 211 formed on the speaker mesh module 2, and the sound output part 22 is disposed corresponding to the opening 11.

Figure 3:
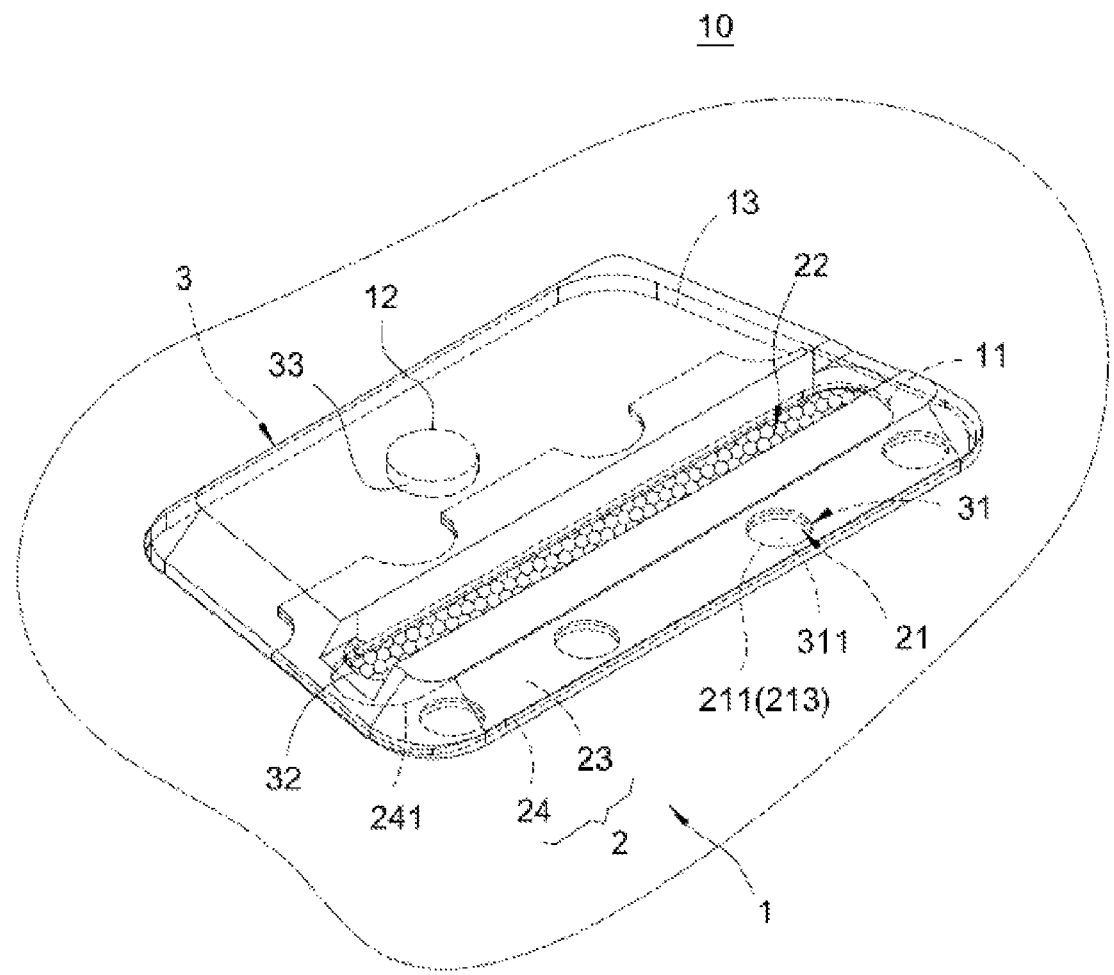
FIG. 3 is a perspective view showing the assembly of the case according to another embodiment of the present invention.

According to this embodiment, the quantity of the groove 211 is plural. As shown in FIG. 1, each of the grooves 211 is composed of a slot 212 inwardly formed from the outer periphery of the speaker mesh module 2. As shown in FIG. 3, each of the grooves 211 can also be composed of a hollow slot 213 penetrating two surfaces of the speaker mesh module 2.

Detail illustration is as follows. The speaker mesh module 2 is formed with a waterproof speaker mesh film 23 and an adhesive film 24. The adhesive film 24 is adhered between the waterproof speaker mesh film 23 and the base 1. The adhesive film 24 is formed with a hollow opening 241. The sound output part 22 is composed of the portion of waterproof speaker mesh film 23 exposed by the hollow opening 241 of adhesive film 24.

As shown in FIG. 1 and FIG. 2, the combination member 3 is secured on the base 1 through the filling port 12 with an injection molding means and served to cover the speaker mesh module 2. The combination member 3 is formed with a combining part 31 and a penetrated hole 32. The combining part 31 and the buckle part 21 are mutually fastened. The penetrated hole 32 is formed corresponding to the sound output part 22.

Detail illustration is as follows. The combining part 31 is composed of one or a plurality of protrusions 311 extended from the combination member 3. According to this embodiment, the quantity of the protrusion 311 is plural and each of the protrusions 311 and each of the grooves 211 are mutually fastened.

In addition, the combination member 3 is formed and secured in the recess 13. The combination member 3 is formed with a protruding block 33, wherein the protruding block 33 is mutually fastened with the filling port 12.

As shown in FIG. 1 and FIG. 2, the assembly of the case 10 is that: the base 1 is formed with the opening 11 and the filling port 12; the speaker mesh module 2 is placed corresponding to the opening 11; the speaker mesh module 2 is formed with the buckle part 21 and the sound output part 22; the combination member 3 is secured on the base 1 through the filling port 12 with an injection molding means and served to cover the speaker mesh module 2; the combination member 3 is formed with the combining part 31 and the penetrated hole 32; the combining part 31 and the buckle part 21 are mutually fastened, and the penetrated hole 32 is formed corresponding to the sound output part 22. Accordingly, the combination member 3 is enabled to be secured on the base 1 through the filling port 12 with an injection molding means and served to cover the speaker mesh module 2. Thus, the speaker mesh module 2 is able to be sealed in the opening 11 with a means other than adhering, thereby allowing the case 10 to be provided with a stable and excellent waterproof performance.

Please refer from FIG. 4 to FIG. 8, which illustrate the manufacturing method of the case 10 having the speaker mesh module 2.

Figure 4:
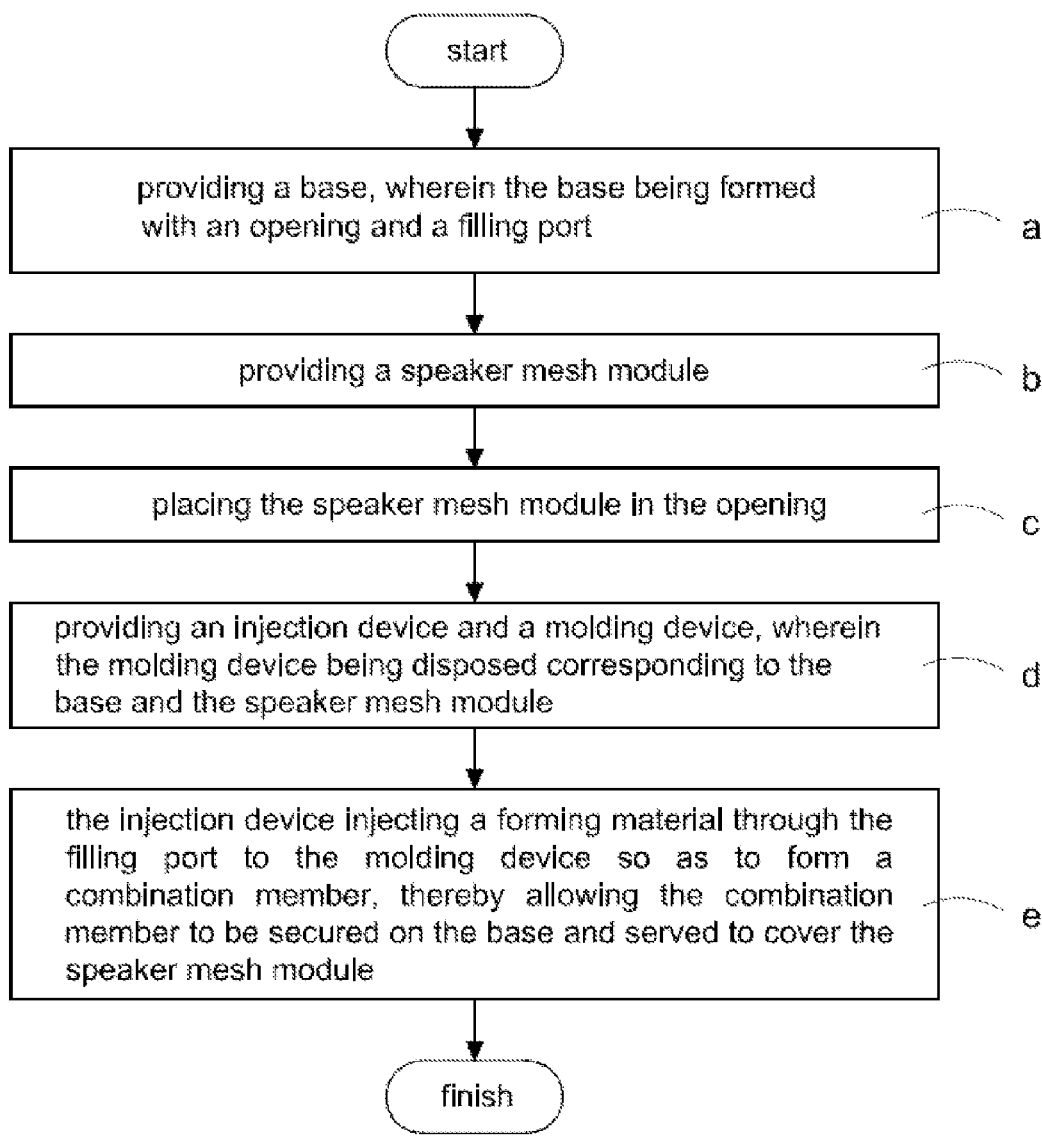
FIG. 4 is a flowchart illustrating the manufacturing method of the case according to the present invention.
Figure 5:
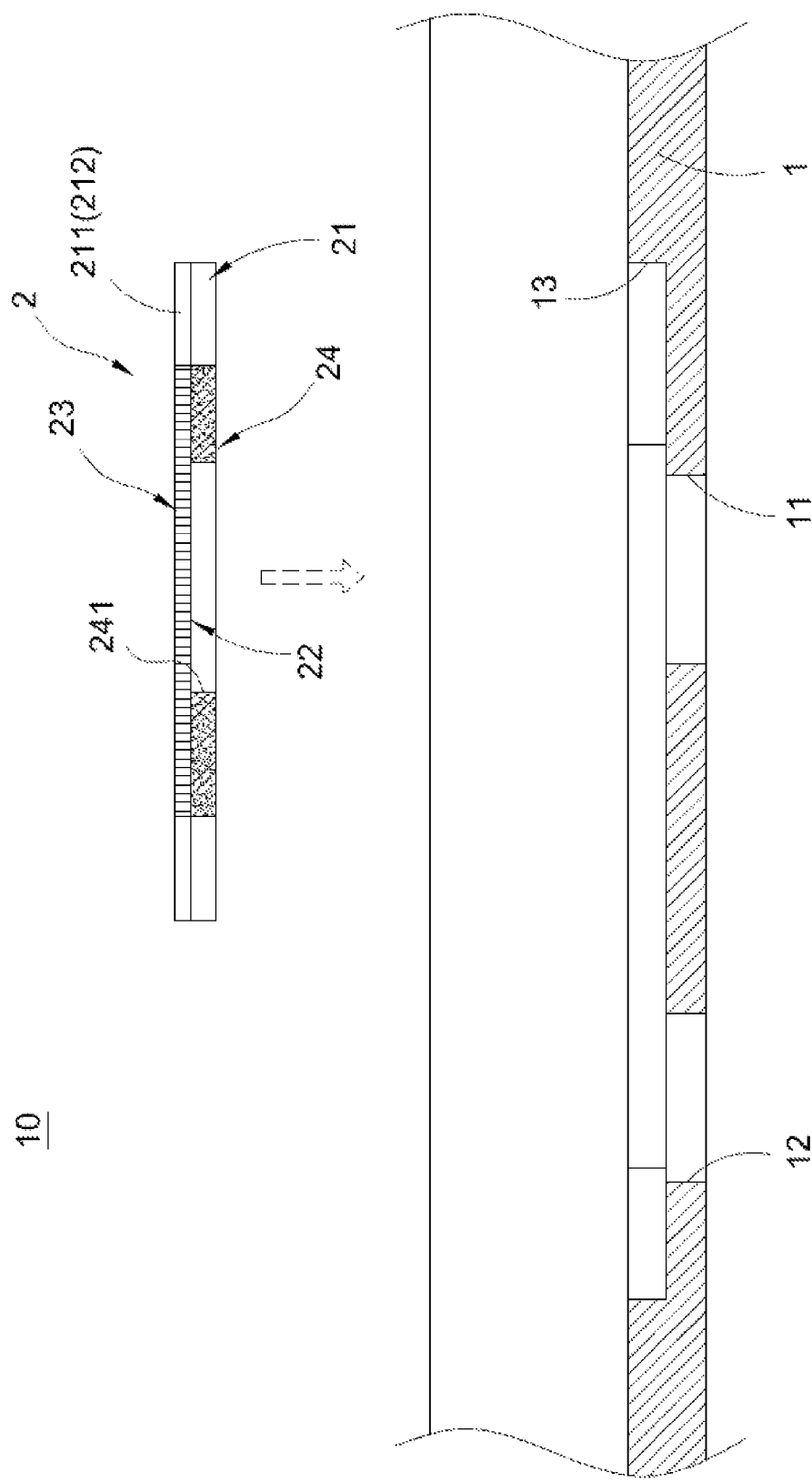
FIG. 5 is a schematic view illustrating the speaker mesh module being placed in the opening according to the present invention.
Figure 6:
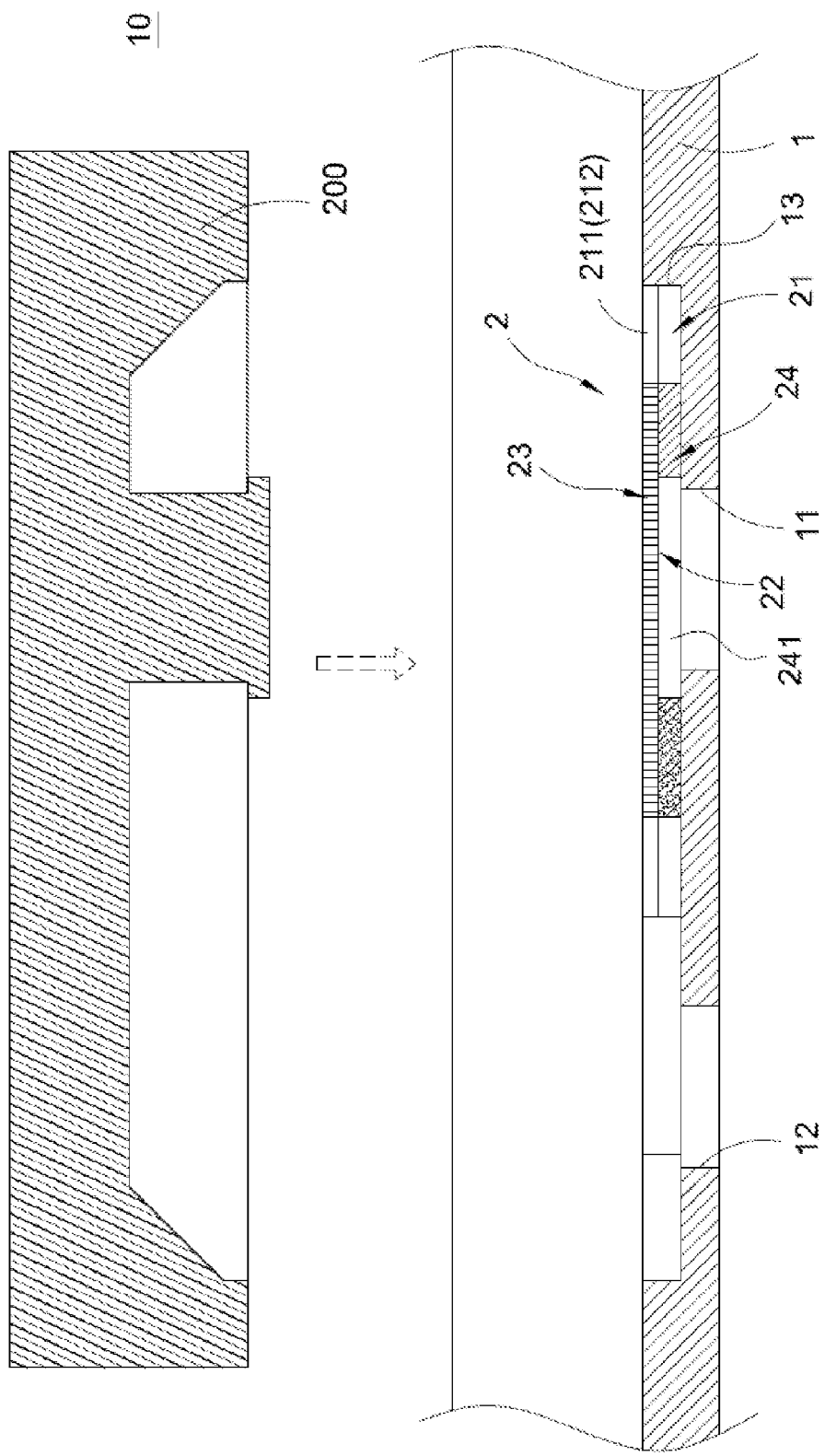
FIG. 6 is a schematic view illustrating the molding device being disposed corresponding to the base and the speaker mesh module according to the present invention.

According to a step a) disclosed in FIG. 4, a base 1 is provided, and the base 1 is formed with an opening 11 and a filling port 12. According to a step b) disclosed in FIG. 4, a speaker mesh module 2 is provided, wherein the speaker mesh module 2 is formed with a buckle part 21 and a sound output part 22. According to a step c) disclosed in FIG. 4 and referring to FIG. 5, the speaker mesh module 2 is placed in the opening 11. According to a step d) disclosed in FIG. 4 and referring to FIG. 6 and FIG. 7, an injection device 100 and a molding device 200 are provided, wherein the molding device 200 is disposed corresponding to the base 1 and the speaker mesh module 2.

Figure 7:
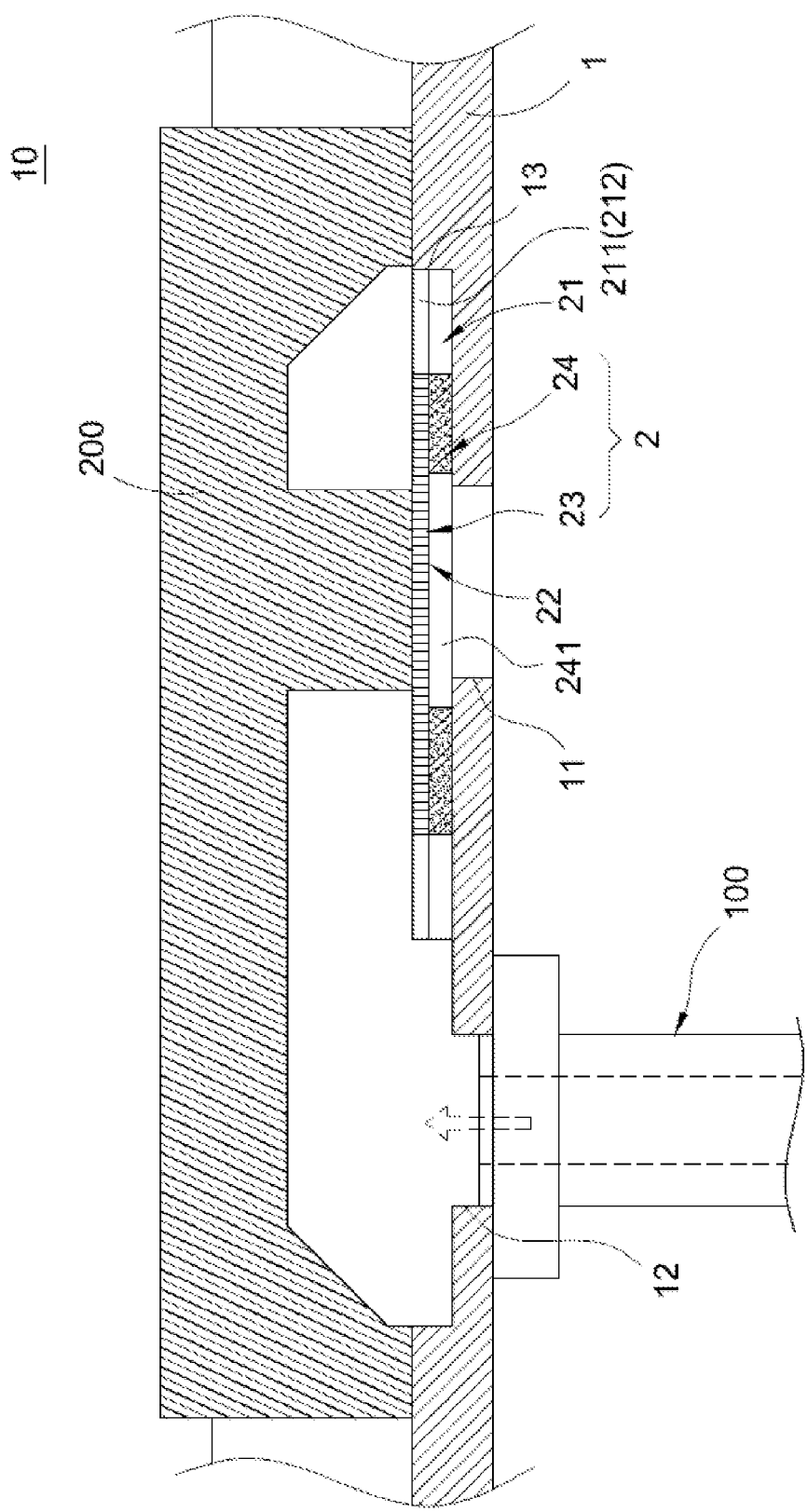
FIG. 7 is a schematic view illustrating the injection device injecting a material through the filling port to the molding device according to the present invention.
Figure 8:
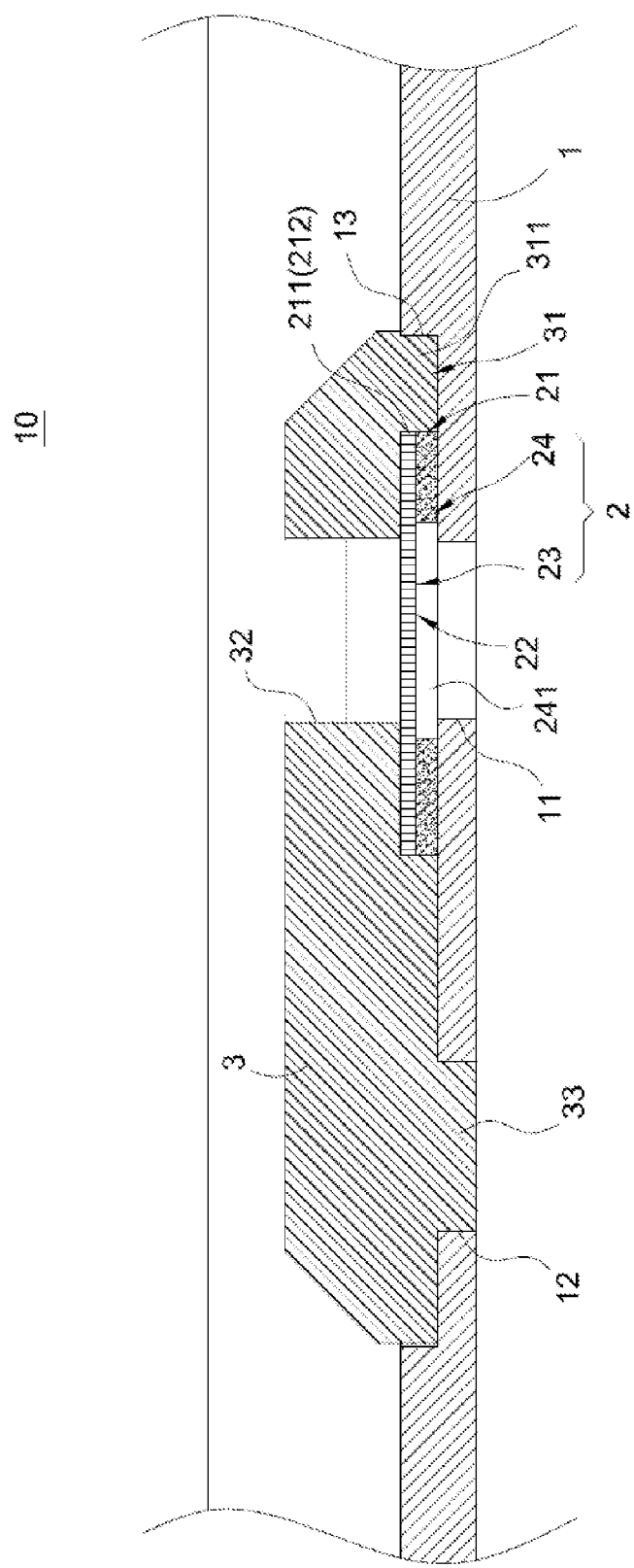
FIG. 8 is a schematic view illustrating the combination member being secured on the base and served to cover the speaker mesh module according to the present invention.

Moreover, according to a step e) disclosed in FIG. 4 and referring to FIG. 7 and FIG. 8, the injection device 100 injects a forming material through the filling port 12 to the molding device 200 so as to form the combination member 3, thereby allowing the combination member 3 to be secured on the base 1 and served to cover the speaker mesh module 2. Wherein, the combination member 3 is formed with a combining part 31 and a penetrated hole 32. The combining part 31 and the buckle part 21 are mutually fastened, and the penetrated hole 32 is formed corresponding to the sound output part 22. Thus, with the above-mentioned structure, the case 10 having the speaker mesh module 2 and the manufacturing method thereof are provided.

Further illustration is as follow.

In the step a), the base 1 is formed with a recess 13, wherein the opening 11 and the filling port 12 are formed at the bottom of the recess 13.

In the step c), the speaker mesh module 2 is formed with a waterproof speaker mesh film 23 and an adhesive film 24, wherein the adhesive film 24 is adhered between the waterproof speaker mesh film 23 and the base 1, thereby enabling the speaker mesh module 2 to be placed in the opening 11.

Wherein, the adhesive film 24 is formed with a hollow opening 241. The sound output part 22 is composed of the waterproof speaker mesh film 23 exposed outside the hollowing opening 241. The sound output part 22 is disposed corresponding to the opening 11.

In the step d), the molding device 200 is disposed corresponding to the recess 13 and the speaker mesh module 2, so the combination member 3 is able to be secured in the recess 13 as disclosed in the step e). The combination member 3 is formed with a protruding block 33, wherein the protruding block 33 is mutually fastened with the filling port 12.

In the step e), the buckle part 21 is of one or a plurality of grooves 211 formed on the speaker mesh module 2, the combining part 31 is composed of one or a plurality of protrusions 311 extended from the combination member 3, and the protrusions 311 are mutually fastened with the grooves 211.

Wherein, as shown in FIG. 1, each of the grooves 211 is composed of a slot 212 inwardly formed from the outer periphery of the speaker mesh module 2; or as shown in FIG. 3, each of the grooves 211 can also be composed of a hollow slot 213 penetrating two surfaces of the speaker mesh module 2.

As shown in FIG. 1, FIG. 2 and FIG. 8, when the case 10 provided by the present invention is in use, the case 10 can be formed as an external sealed case for enclosing and storing an electronic device, or the case 10 can be formed as a case of an electronic device for enclosing and storing electric components of the electronic device. The speaker mesh module 2 is correspondingly placed in the opening 11. The combination member 3 is secured on the base 1 through the filling port 12 with an injection molding means and served to cover the speaker mesh module 2. Thus, the case 10 is provided with effects of dustproof and waterproof, and a speaker stored in the case 10 is enabled to transmit sound to the exterior through the opening 11 and the speaker mesh module 2.

In addition, the combination member 3 is secured on the base 1 with an injection molding means and served to cover the speaker mesh module 2. The speaker mesh module 2 is formed with the buckle part 21. The combination member 3 is formed with the combining part 31. The combining part 31 is mutually fastened with the buckle part 21. Thus, the base 1, the speaker mesh module 2 and the combination member 3 can be tightly matched through the injection molding means. Accordingly, the case 10 can be composed of simple components for allowing the case 10 to be provided with effects of dustproof and waterproof, so the case 10 has advantages of simple in components and easy in assembly.

Detail illustration is as follows. The buckle part 21 is composed the grooves 211 formed on the speaker mesh module 2. In the process of the injection device 100 injecting the forming material through the filling port 12 to the molding device 200, the grooves 211 allow the forming material (such as plastic, rubber, ceramic, liquid-state metal, metal powders or other reaction materials) to flow into the space for being combined with the base 1 so as to form a riveting force. When the forming material (such as plastic, rubber, ceramic, liquid-state metal, metal powders or other reaction materials) is formed as the combination member 3, the combination member 3 is enabled to be tightly combined with the base 1 with the injection molding means.

Moreover, the protrusions 311 of the combination member 3 and the grooves are mutually fastened, so the speaker mesh module 2 is positioned by the protrusions 311. Thus, the combination member 3 is able to position the speaker mesh module 2 with the injection molding means, thereby allowing the speaker mesh module 2 to be stably placed and sealed in the opening 11. Accordingly, the speaker mesh module 2 is able to be sealed in the opening 11 with a means other than adhering, thereby preventing the case 10 from having poor dustproof and waterproof performance due to the insufficient adhesion.

Furthermore, when the case 10 is subject to a friction force or a shaking force, because the speaker mesh module 2 is covered by the combination member 3, the speaker mesh module 2 is still able to be placed and sealed in the opening 11, so the speaker mesh module 2 and the base 1 are tightly combined thereby preventing water from permeating and ensuring the structural stability. Thus, the case 10 of the present invention is provided with excellent dustproof and waterproof performance.

In addition, the speaker mesh module 2 is formed with the waterproof speaker mesh film 23 and the adhesive film 24. The adhesive film 24 is adhered between the waterproof speaker mesh film 23 and the base 1 thereby enabling the speaker mesh module 2 to be placed in the opening 11. Thus, the waterproof speaker mesh film 23 is able to be tightly adhered on the base 1 through the adhesive film 24, and the speaker mesh module 2 can be stably placed and sealed in the opening 11, thereby further enhancing the dustproof and waterproof performance of the case 10.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A case having a speaker mesh module, including:
 a base comprising a wall and a recess formed in an exterior surface of the wall, wherein an opening and a filling port are formed in the recess and penetrate through the wall;
 a speaker mesh module comprising an adhesive film and a speaker mesh film, the adhesive film comprising an opening corresponding to the opening in the base, and the speaker mesh film overlaying the openings in the base and the adhesive film; and
 a combination member, formed in the recess by injection molding via the filling port and covering the speaker mesh module, the combination member comprising a protruding block formed in and fastened to the filling port, a combining part fastened to the adhesive film, and a hole corresponding to the opening in the base.

2. The case having the speaker mesh module according to claim 1, wherein the speaker mesh module includes a buckle part composed of at least one groove, the combining part is composed of at least one protrusion extended from the combination member, and the protrusion and the groove are mutually fastened.

3. The case having the speaker mesh module according to claim 2, wherein the quantity of grooves is plural, and each of the grooves is composed of a slot inwardly formed from the outer periphery of the speaker mesh module.

4. The case having the speaker mesh module according to claim 2, wherein the quantity of grooves is plural, and each of the grooves is composed of a hollow slot penetrating two surfaces of the speaker mesh module.

5. The case having the speaker mesh module according to claim 1, wherein speaker mesh film is waterproof.

6. A manufacturing method of a case having a speaker mesh module, including the steps of:
   providing a base, wherein a recess is formed in an exterior surface of a wall of the base, and an opening and a filling port are formed in the recess and penetrate through the wall;
   disposing a speaker mesh module in the recess, wherein the speaker mess module comprises a speaker mesh film arranged to overlay the opening in the base; and
   forming a combination member in the recess by disposing a molding device on the exterior surface of the base, wherein the molding device comprises a cavity arranged over the recess, and disposing an
   injection device at an interior surface of the base, and then injecting a forming material through the filling port and then into the cavity of the molding device so as to form the combination member in the recess and secured to the base;
   wherein the combination member comprises an hole exposing the speaker mesh film and corresponding to the opening in the base.

7. The manufacturing method of a case having a speaker mesh module according to claim 6, wherein the forming material fills the filling port to form a protruding block of the combination member, and the protruding block is fastened to the filling port.

8. The manufacturing method of a case having a speaker mesh module according to claim 6, wherein the speaker mesh module further comprises an adhesive film disposed between the speaker mesh film and the base, the adhesive film comprising a opening corresponding to the opening in the base, wherein the combination member is formed with a combining part fastened to the adhesive film in the recess.

9. The manufacturing method of a case having a speaker mesh module according to claim 6, wherein the speaker mesh module includes a buckle part composed of at least one groove, the combining part is composed of at least one protrusion extended from the combination member, and the protrusion and the groove are mutually fastened.

10. The manufacturing method of a case having a speaker mesh module according to claim 9, wherein the quantity of grooves is plural, and each of the grooves is composed of a slot inwardly formed from the outer periphery of the speaker mesh module.

11. The manufacturing method of a case having a speaker mesh module according to claim 9, wherein the quantity of grooves is plural, and each of the grooves is composed of a hollow slot penetrating two surfaces of the speaker mesh module.

12. The manufacturing method of a case having a speaker mesh module according to claim 6, wherein speaker mesh film is waterproof.

* * * * *